United States Patent
Swanson

(10) Patent No.: US 9,367,895 B2
(45) Date of Patent: Jun. 14, 2016

(54) AUTOMATED SLIVER REMOVAL IN ORTHOMOSAIC GENERATION

(71) Applicant: DIGITALGLOBE, INC., Longmont, CO (US)

(72) Inventor: Nathan Swanson, Erie, CO (US)

(73) Assignee: DigitalGlobe, Inc., Longmont, CO (US)

( * ) Notice: Subject to any disclaimer, the term of this patent is extended or adjusted under 35 U.S.C. 154(b) by 41 days.

(21) Appl. No.: 14/219,884

(22) Filed: Mar. 19, 2014

(65) Prior Publication Data

US 2015/0269707 A1    Sep. 24, 2015

(51) Int. Cl.
*G06K 9/36* (2006.01)
*G06T 3/40* (2006.01)

(52) U.S. Cl.
CPC ........... *G06T 3/4038* (2013.01); *G06T 2200/32* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS

| | | | |
|---|---|---|---|
| 6,075,905 A * | 6/2000 | Herman et al. | 382/284 |
| 6,275,304 B1 * | 8/2001 | Eschbach et al. | 358/1.9 |
| 6,393,163 B1 | 5/2002 | Burt et al. | |
| 7,006,111 B1 | 2/2006 | Rothrock | |
| 7,271,934 B2 * | 9/2007 | McElvain | 358/1.9 |
| 7,873,238 B2 * | 1/2011 | Schultz et al. | 382/284 |
| 2010/0034483 A1 | 2/2010 | Giuffrida et al. | |
| 2010/0142842 A1 | 6/2010 | Damkjer et al. | |

FOREIGN PATENT DOCUMENTS

JP    2013034208 A    2/2013

OTHER PUBLICATIONS

International Search Report for International Application No. PCT/US2015/021069 dated Jun. 24, 2015.

* cited by examiner

*Primary Examiner* — Feng Niu
(74) *Attorney, Agent, or Firm* — Robert G. Crouch; Marsh Fischmann & Breyfogle LLP

(57) ABSTRACT

Techniques for automatically removing slivers from orthomosaics. First, slivers may be identified, which may be based upon user-configurable characteristics such as width and length. Second, slivers may be replaced with portions of another image, such as an older image. Third, boundary slivers may optionally be removed. Fourth, remaining boundary or interior slivers can be inflated by expanding the sliver until it is no longer a sliver, which may include replacing a portion of an adjacent image portion with older imagery.

22 Claims, 12 Drawing Sheets

AUTOMATED SLIVER REMOVAL IN ORTHOMOSAIC GENERATION

BACKGROUND

The use of geospatial imagery (e.g., satellite imagery) has continued to increase in recent years. As such, high quality geospatial imagery has become increasingly valuable. For example, a variety of different entities (e.g., government entities, corporations, individuals, or others) may utilize satellite imagery. As may be appreciated, the use of such satellite imagery may vary widely such that satellite images may be used for a variety of differing purposes.

Due to the nature of image acquisition, a number of geospatial images may be pieced together to form an orthomosaic of a collection of geospatial images that cover a larger geographic area than may be feasibly covered with a single acquired image. In this regard, it may be appreciated that the images that form such an orthomosaic may be acquired at different times or may be acquired using different collection techniques or parameters. In situations where more than one image is available for a given region of interest on the ground, it may be desirable to use the most recent image. Various artifacts can be introduced when multiple separate images are combined into an orthomosaic.

One such artifact is known as a sliver, which is typically a thin, elongated region of an image that is used in an orthomosaic and may have different characteristics as compared to an adjacent portion in the orthomosaic that is created from a different image. For example, the adjacent image portion may be taken in different lighting conditions (cloudy vs. sunny, different image acquisition angles, different sun angles to the ground, and so forth), different seasons of the year (thus different grass and tree colors and so forth), or other different conditions.

Up until recently, orthomosaic generation has always included manual selection of images by a human operator. Generally, the human operator is tasked with reviewing all available images for an area of interest and choosing images for inclusion in the orthomosaic utilizing what the human operator subjectively determines to be the "best" source images. The subjective determinations of the human operator are often guided by a principle that it is preferential to include as few images in the orthomosaic as possible. The human operator may take steps to remove or reduce the number of slivers. In turn, an orthomosaic may be generated utilizing the human-selected images to form the orthomosaic.

As may be appreciated, this human operator-centric process may be time consuming and costly. Moreover, the image selection is subjective to the human user. Accordingly, recent developments have included fully automated or partially automated orthomosaic generation. Such techniques and algorithms may generate undesirable slivers.

It is against this background that the techniques described herein have been developed.

SUMMARY

In view of the foregoing, the present disclosure is generally directed to a computer-implemented process for improving an orthomosaic composed of portions from a plurality of different images. The process includes providing an orthomosaic composed of portions of a first image and portions of a second image, wherein the first image was captured later in time than the second image; automatically detecting with a computer one or more slivers in the orthomosaic by identifying one or more portions of the first image in the orthomosaic that have a width less than a predetermined width and a length greater than a predetermined length and by identifying one or more portions of the second image in the orthomosaic that have a width less than a predetermined width and a length greater than a predetermined length; automatically with a computer substituting a portion of the second image for one of the detected slivers from the first image; automatically with a computer removing one or more slivers along a perimeter of the orthomosaic; and automatically with a computer inflating one or more remaining slivers from the second image.

The identifying may include performing an erosion on one or more of the portions followed by an inflation of the eroded portion and then comparing the result of the inflation to the portion that existed prior to the erosion. The identifying may include counting the number of pixels wide and the number of pixels long for one of more portions of the first image. Portions of the first image and portions of the second image may overlap with each other as to geodetic portions captured in each image, and wherein the substituted portions of the first and second images are overlapping portions. The removing portion of the process may be optional, based on a user configuration made prior to the computer running the process. If the user configuration for perimeter sliver removal is made, all of the boundary slivers may be removed.

All of the boundary slivers may be removed. The inflated slivers may be those that are not along a perimeter of the orthomosaic. The inflating may include replacing portions of adjacent portions of the orthomosaic. The replaced portions may be from the first image and the replacing portions may be from the second image. Portions of the first image and portions of the second image may overlap with each other as to geodetic portions captured in each image, and wherein the replaced portions and the replacing portions of the first and second images, respectively, are overlapping portions. The inflated slivers may be those that are not along a perimeter of the orthomosaic.

Another aspect is a computer-implemented process for improving an orthomosaic composed of portions from a plurality of different images. The process includes providing an orthomosaic composed of portions of a first image and portions of a second image, wherein the first image was captured later in time than the second image; automatically detecting with a computer one or more slivers in the orthomosaic by identifying one or more portions of the first image in the orthomosaic that have a width less than a predetermined width and a length greater than a predetermined length; and automatically with a computer substituting a portion of the second image for one of the detected slivers.

The identifying may include performing an erosion on one or more of the portions followed by an inflation of the eroded portion and then comparing the result of the inflation to the portion that existed prior to the erosion. The identifying may include counting the number of pixels wide and the number of pixels long for one of more portions of the first image. Portions of the first image and portions of the second image may overlap with each other as to geodetic portions captured in each image, and wherein the substituted portions of the first and second images are overlapping portions.

Another aspect is a computer-implemented process for improving an orthomosaic composed of portions from a plurality of different images. The process includes providing an orthomosaic composed of portions of a first image and portions of a second image, wherein the first image was captured later in time than the second image; automatically detecting with a computer one or more slivers in the orthomosaic by identifying one or more portions of the first image in the orthomosaic that have a width less than a predetermined width and a length greater than a predetermined length; and automatically removing with a computer one or more slivers along a perimeter of the orthomosaic.

The removing portion of the process may be optional, based on a user configuration made prior to the computer running the process. If the user configuration for perimeter sliver removal is made, all of the boundary slivers may be removed. All of the boundary slivers may be removed.

Still another aspect is a computer-implemented process for improving an orthomosaic composed of portions from a plurality of different images. The process includes providing an orthomosaic composed of portions of a first image and portions of a second image, wherein the first image was captured later in time than the second image; automatically detecting with a computer one or more slivers in the orthomosaic by identifying one or more portions of the second image in the orthomosaic that have a width less than a predetermined width and a length greater than a predetermined length; and automatically inflating with a computer one or more of the slivers.

The inflated slivers may be those that are not along a perimeter of the orthomosaic. The inflating may include replacing portions of adjacent areas of the orthomosaic. The replaced portions may be from the first image and the replacing portions may be from the second image. Portions of the first image and portions of the second image may overlap with each other as to geodetic portions captured in each image, and wherein the replaced portions and the replacing portions of the first and second images, respectively, are overlapping portions. The inflated slivers may be those that are not along a perimeter of the orthomosaic.

One more aspect is a computer-implemented process for improving an orthomosaic composed of portions from a plurality of different images. The process includes providing an orthomosaic composed of portions of a first image and portions of a second image, wherein the first image was captured later in time than the second image; automatically detecting with a computer one or more slivers in the orthomosaic by identifying one or more portions of the second image in the orthomosaic that have a width less than a predetermined width; and automatically removing with a computer one or more of the slivers.

The automatically removing operation may be performed first on the older, second image and then on the newer, first image. The automatically removing may include automatically with a computer substituting a portion of the second image for one of the detected slivers from the first image. The automatically removing may include automatically with a computer removing one or more slivers along a perimeter of the orthomosaic. The automatically removing may include automatically with a computer inflating one or more remaining slivers from the second image. The automatically detecting with a computer one or more slivers in the orthomosaic may further include identifying the one or more portions of the second image in the orthomosaic that have a length greater than a predetermined length.

DETAILED DESCRIPTION

Figure 1:
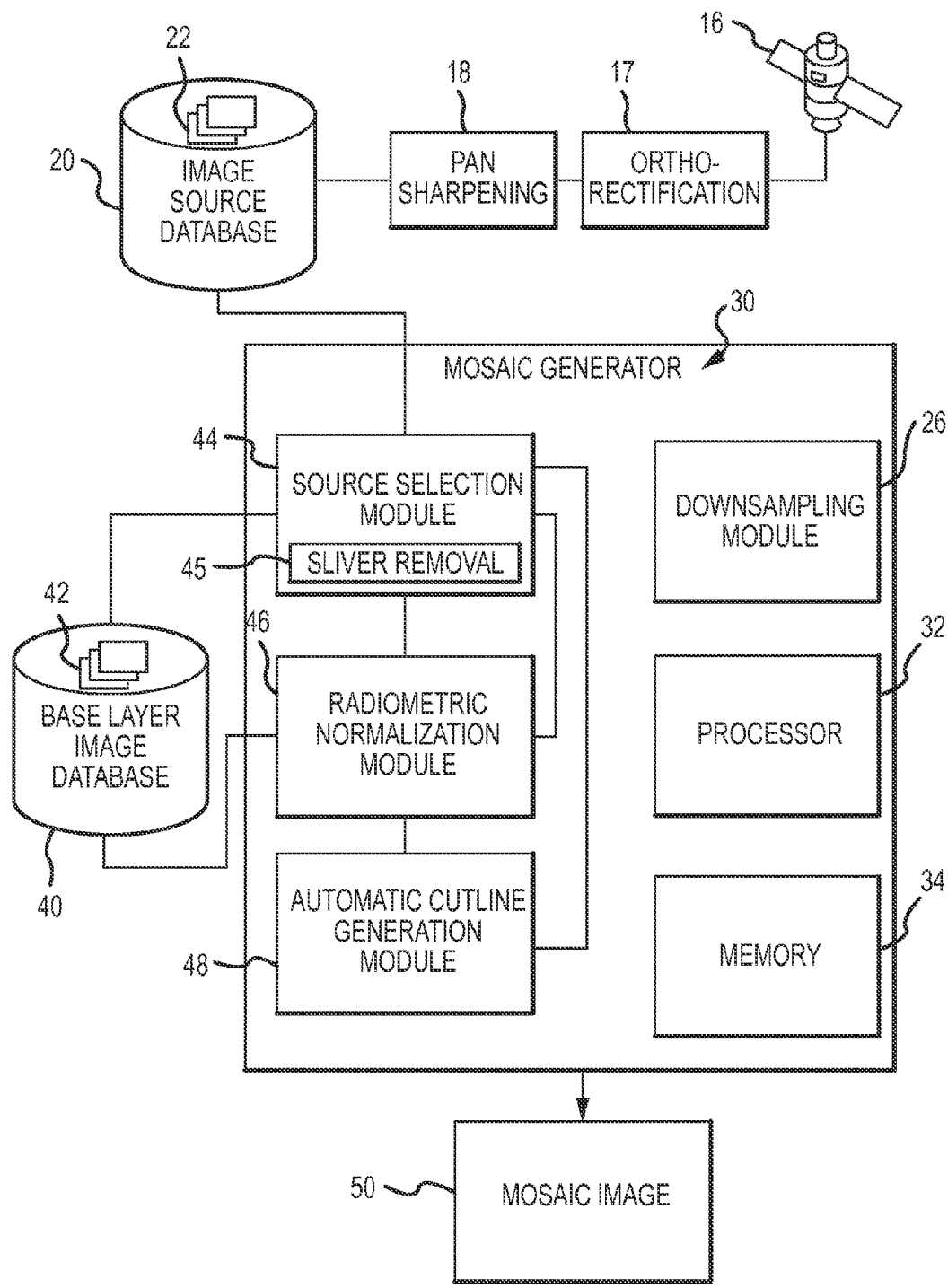
FIG. 1 is a block diagram of an embodiment of an orthomosaic generator.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The present disclosure generally relates to functionality that may be utilized in automatic generation of an orthomosaic that may be generated from a plurality of geospatial images. For example, in an embodiment, the geospatial source images for the orthomosaic may be satellite images acquired using low earth orbit satellites such as QuickBird, WorldView-1, WorldView-2, WorldView-3, IKONOS, GeoEye-1, or GeoEye-2 which are currently operated or proposed for operation by DigitalGlobe, Inc. of Longmont, Colo. However, other geospatial imagery may also be used to generate an orthomosaic as described herein such as for example, other geospatial imagery obtained from satellites other than those previously listed, high altitude aerial photograph, or other appropriate remotely sensed imagery. The images to be selected for inclusion in an orthomosaic may comprise raw image data or pre-processed geospatial images (e.g., that have undergone orthorectification, pan-sharpening, or other processes known in the art that are commonly applied to geospatial imagery).

In any regard, according to the present disclosure, a geospatial orthomosaic comprising a plurality of geospatial images may be generated such that, for example, image source selection occurs automatically (i.e., without requiring a human operators to select images for use in the orthomosaic). In addition, cutlines may be automatically generated for merging a plurality of images such that cutlines defining boundaries between the plurality of merged images are generated to minimize noticeable differences at image interfaces in a merged image (orthomosaic). In this regard, cutlines between images in the orthomosaic may be less perceivable to human observers of the orthomosaic images. Further detail on these and other related techniques is available in U.S. patent application Ser. No. 13/838,475, entitled "AUTOMATED GEOSPATIAL IMAGE MOSAIC GENERATION," and filed on Mar. 15, 2013; U.S. patent application Ser. No. 13/952,442, entitled "AUTOMATED GEOSPATIAL IMAGE MOSAIC GENERATION WITH AUTOMATIC SOURCE SELECTION," and filed on Jul. 26, 2013; and U.S. patent application Ser. No. 13/952,464, entitled "AUTOMATED GEOSPATIAL IMAGE MOSAIC GENERATION WITH AUTOMATIC CUTLINE GENERATION," and filed on Jul. 26, 2013, the entire contents of each of which are incorporated by reference in their entirety.

Accordingly, with respect to FIG. 1, an orthomosaic generator 30 is shown. The orthomosaic generator 30 may include a source selection module 44, an automatic cutline generation module 48, and a radiometric normalization module 46. As may be appreciated, the orthomosaic generator 30, source selection module 44, automatic cutline generation module 48, and radiometric normalization module 46 may include hardware, software, or a combination thereof. For example, the modules 44-48 may each include non-transitory computer readable data comprising computer readable program code stored in a memory 34 of the orthomosaic generator 30. The program code may include instructions for execution of a processor 32 operable to access and execute the code. As such, upon execution of the processor 32 according to the computer readable program code, any or all of the functionality described below with respect to corresponding ones of the modules 44-48 may be provided. Furthermore, while modules 44-48 are shown in a particular order in FIG. 1, it may be appreciated that the modules may be executed in any appropriate order. Furthermore, in some embodiments, only a portion of the modules may be executed. As such, it will be appreciated that the modules may be executed independently or, as will be described herein, in conjunction to produce an orthomosaic.

While FIG. 1 shows a single processor 32 and memory 34, it may be appreciated that the orthomosaic generator 30 may include one or more processors 32 and/or memories 34. For example, a plurality of processors 32 may execute respective ones or combinations of the source selection module 44, automatic cutline generation module 48, and radiometric normalization module 46. Furthermore, it may be appreciated that the orthomosaic generator 30 may be a distributed system such that various ones of the modules 44-48 may be executed remotely by networked processors 32 and/or memories 34. Furthermore, different processes of the modules 44-48 may be executed on different processing units to capitalize on various performance enhancements of the processing units. For example, some processes may be executed on a central processing unit (CPU) while others may be executed by a graphics processing unit (GPU) as will be explained in greater detail below.

The source selection module 44 may be in operative communication with an image source database 20. As mentioned above, the image source database 20 may include raw geospatial images (e.g., corresponding to the direct output of sensor arrays on a satellite 16) or geospatial images that have undergone some amount of pre-processing. For instance, the pre-processing may include orthorectification processes 17 commonly practiced in the art. Additionally or alternatively, the pre-processing may include pan-sharpening 18 as described in U.S. patent application Ser. No. 13/452,741, entitled "PAN SHARPENING DIGITAL IMAGERY," and filed on Apr. 20, 2012, the entire contents of which is incorporated by reference in its entirety. Other pre-processing techniques may be performed with respect to the geospatial images stored in the image source database 20 without limitation.

In this regard, the image source database may include one or more geospatial source images 22. As may be appreciated, the geospatial source images 22 may comprise relatively high resolution images. The resolution of images is sometimes referred to herein with a distance measure. This distance measure refers to a corresponding distance on Earth each pixel in the image represents. For example, each pixel in a 15 m image may represent 15 m of width and length on Earth. As such, the geospatial images 22 may include image resolutions of, for example, 0.25 m, 0.5 m, 1 m, 5 m, 15 m, 30 m, or any other suitable resolution.

Further still, the geospatial images 22 may include multiple versions of a single image 22 at different resolutions. For purposes of clarity herein, high resolution and low resolution versions of an image may be discussed. In this regard, a high resolution version of an image described herein may include a reference numeral (e.g., geospatial image 22). A low resolution version of the same image may be described with a single prime designation (e.g., geospatial image 22'). If further resolutions of the same image are referenced, multiple prime (e.g., double prime, triple prime, etc.) reference numerals may be used where the larger the prime designation, the lower the resolution of the image. In this regard, the orthomosaic generator 30 may include a downsampling module 26 that may be operable to downsample an image from a higher resolution to a lower resolution. Any appropriate downsampling technique may be employed to generate one or more different lower resolution versions of a given image. In this regard, any of the modules 44-48 may be in operative communication with a downsampling module 26 to obtain downsampled versions of images as disclosed below. In various embodiments, at least one of the modules 44-48 may include separate downsampling capability such that a separately executed downsampling module 26 is not required.

In any regard, as shown in FIG. 1, the source selection module 44 may be in operative communication with the image source database 20. As will be described in greater detail below, the image source selection module 44 may be operative to analyze a plurality of geospatial images 22 from the image source database 20 to choose selected images 22 or portions of images 22 for inclusion in an orthomosaic image 50.

The image source selection module 44 may also be operable to access a base layer image database 40. The base layer image database 40 may include one or more base layer images 42. As will be discussed in greater detail below, the image source selection module 44 may select the images 22 from the image source database 20 at least partially based on a comparison to a corresponding base layer image 42 as will be described below. In this regard, the base layer image(s) 42 may also be geospatial images (e.g., at lower resolutions than the source images 22) that have a known geospatial reference. In this regard, the source images 22 may be correlated to geographically corresponding base layer image(s) 42 such that comparisons are made on geographically concurrent portions of the geospatial source images 22 and base layer image(s) 42.

As is described in greater detail below, the source selection module 44 may optionally include a sliver removal module 45. This module 45 may include algorithms for removing slivers through a combination of substituting for the slivers, removing certain boundary slivers, and inflating still other slivers. Generally, it is considered to not be an acceptable solution to introduce holes into the interior of an orthomosaic. Otherwise, a simple solution might be to simply erase all slivers and be done. The sliver removal module 45 is shown as part of the source selection module 44 as an example, however, it could be included in the radiometric normalization module 46, the automatic cutline generation module 48, or some other module not shown. Alternatively, the module 45 could be a standalone module.

Upon selection of the images 22 for inclusion in the orthomosaic 50, it may be appreciated that certain portions of at least some of the images 22 may benefit from merging with others of the selected images 22. That is, two selected images 22 may have some region of overlap in the resulting orthomosaic. In this regard, the source selection module 44 may output at least some of the selected images 22 to the automatic cutline generation module 48. As will be described in greater detail below, the automatic cutline generation module 48 may determine appropriate outlines for merging overlapping selected images 22 to create a merged image.

Additionally, the selected images 22 (e.g., including merged images that are produced by the automatic cutline generator 48) may be output to the radiometric normalization module 46. In this regard, the radiometric normalization module 46 may be operable to perform a radiometric normalization technique on one or more of the selected images 22. In this regard, the radiometric normalization module 46 may also be in operative communication with the base layer image database 40. As will be described in greater detail below, the radiometric normalization module 46 may be operable to perform radiometric normalization at least partially based on a comparison of a selected image 22 to a corresponding base layer image 42 to normalize radiometric properties (e.g., color) of the selected images 22 relative to the base layer image 42. When referencing "color" in the context of radiometric parameters for an image, it may be appreciated that "color" may correspond with one or more intensity values (e.g., a brightness) for each of a plurality of different spectral bands. As such, a "color" image may actually comprise at least three intensity values for each of a red, blue, and green spectral band. Furthermore, in a panchromatic image (i.e., a black and white image), the intensity value may correspond to gray values between black and white. As such, when comparing "color," individual or collective comparison of intensities for one or more spectral bands may be considered. As such, the selected images 22 may be processed by the radiometric normalization module 46 to achieve a more uniform color (e.g., intensities or brightness for one or more spectral bands) for the orthomosaic 50. In turn, an orthomosaic 50 may be automatically and/or autonomously generated by the orthomosaic generator 30 that may be of very high resolution (e.g., a corresponding resolution to the source images 22) that is relatively uniform in color to produce a visually consistent orthomosaic 50.

Figure 2:
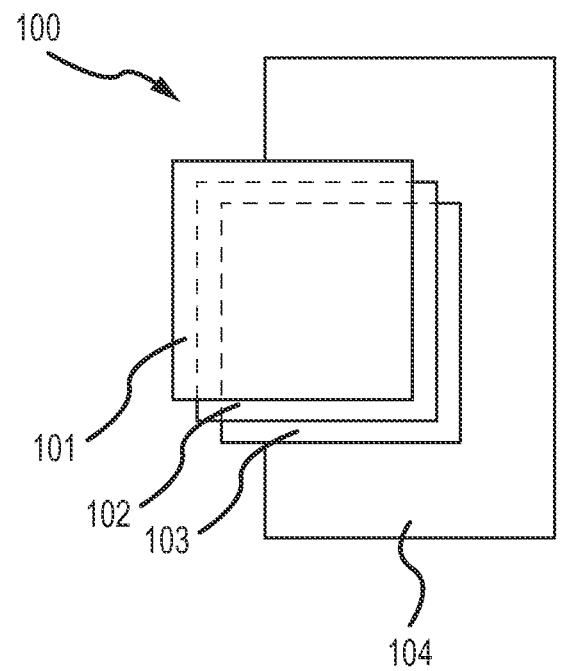
FIG. 2 is a stack of images, stacked from newest to oldest.
Figure 3:
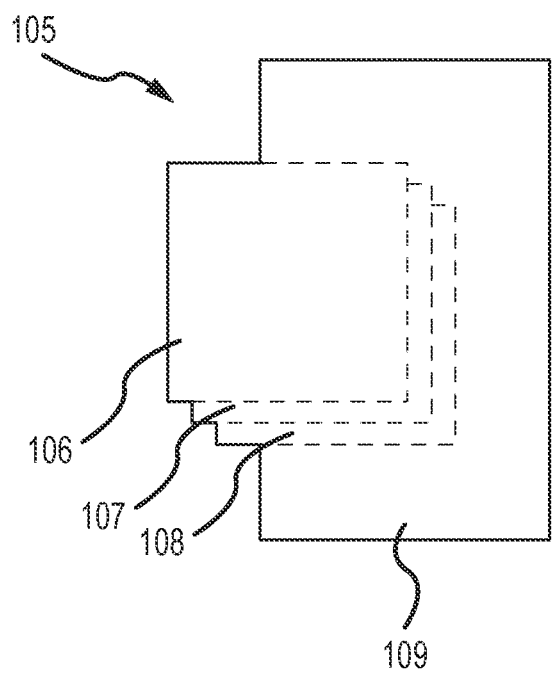
FIG. 3 is an orthomosaic formed from the image stack of FIG. 2.

FIG. 2 illustrates a stack 100 of images from which a simple orthomosaic may be formed. The stack 100 includes four different images 101, 102, 103, and 104 that are shown here stacked with the most recent image at the top of the stack. Further, the stack may be shown in FIG. 2 with the images 101, 102, 103, and 104 in positions relative to each other corresponding to the ground positions covered by each of the images. As stated previously, in many cases it may be desirable to use the most recent image of a given ground position, to the extent possible. Therefore, FIG. 3 shows an orthomosaic 105 that contains the entire portion 106 of image 101, a peripheral portion 107 of image 102, a peripheral portion 108 of image 103, and a portion 109 of image 104. As can be appreciated, the portions 107 and 108 may be considered to be thin and elongated and thus undesirable slivers in the orthomosaic 105. Further, time is but one example of a metric by which the images can be ordered. It may be desirable in some instances to order the images based on other parameters such as cloud cover, sun angle, or other parameter, or based on some type of score or combination of parameters. In addition, in situations where time is the metric used to order the images, it is possible that two different images have the same time stamp. In such a situation, an arbitrary or some other technique could be used to "break the tie."

Figure 4:
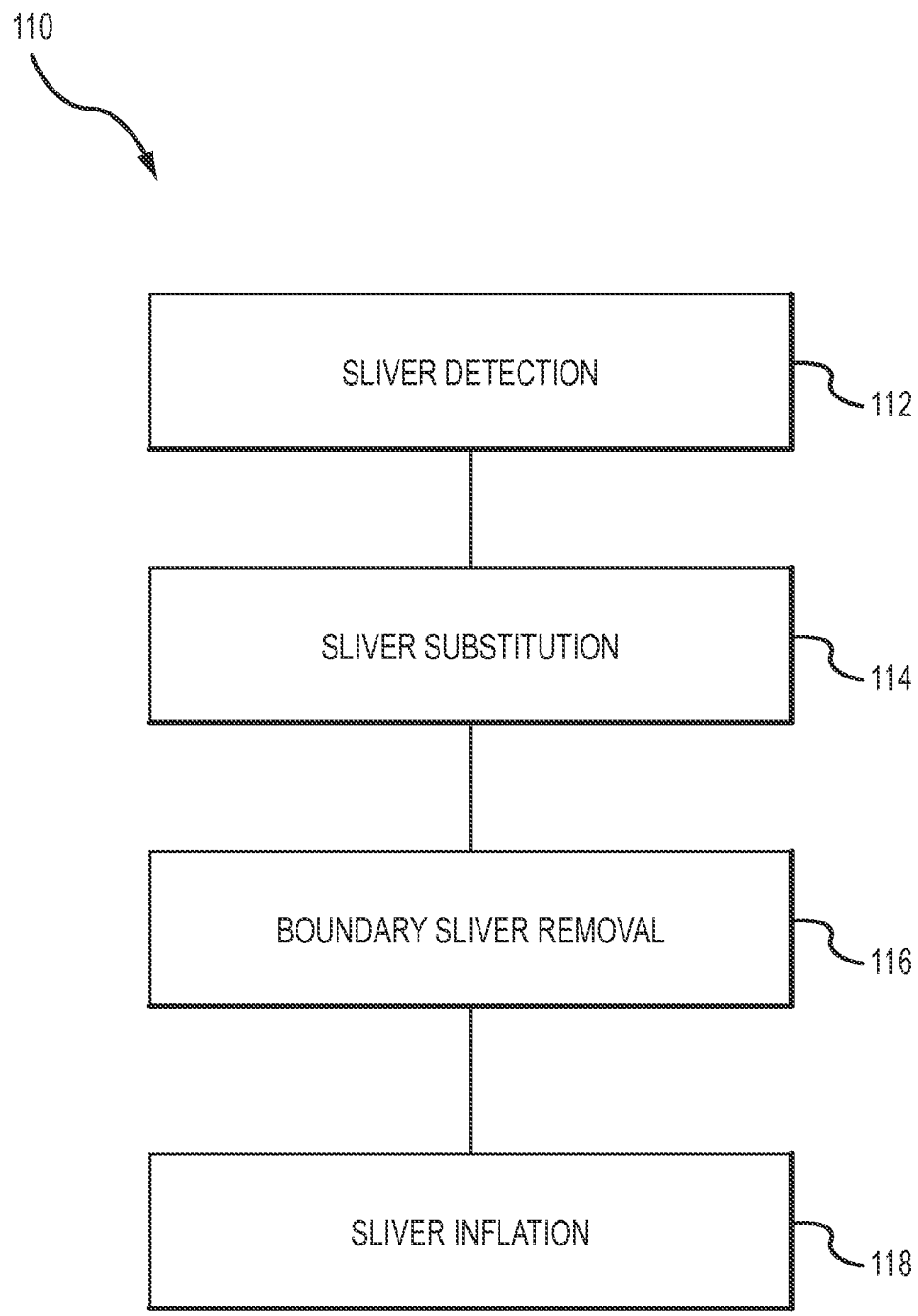
FIG. 4 is a flowchart of the process for automated sliver removal.

In order to address issues with slivers, the overall process 110 of FIG. 4 may be performed or any combination of the various portions of the process 110 may be performed. Slivers may be detected (Sliver Detection (112)), based on user-configurable characteristics such as length and width. Sliver Substitution (114) may be performed to remove certain slivers and replace them with a portion of a different image. Boundary Sliver Removal (116) may be performed to remove slivers along the boundary of the orthomosaic, if desired. Sliver Inflation (118) may be performed to inflate a sliver until it no longer qualifies as a sliver. Each of these techniques 112, 114, 116, and 118 will be discussed in further detail below.

Figure 5:
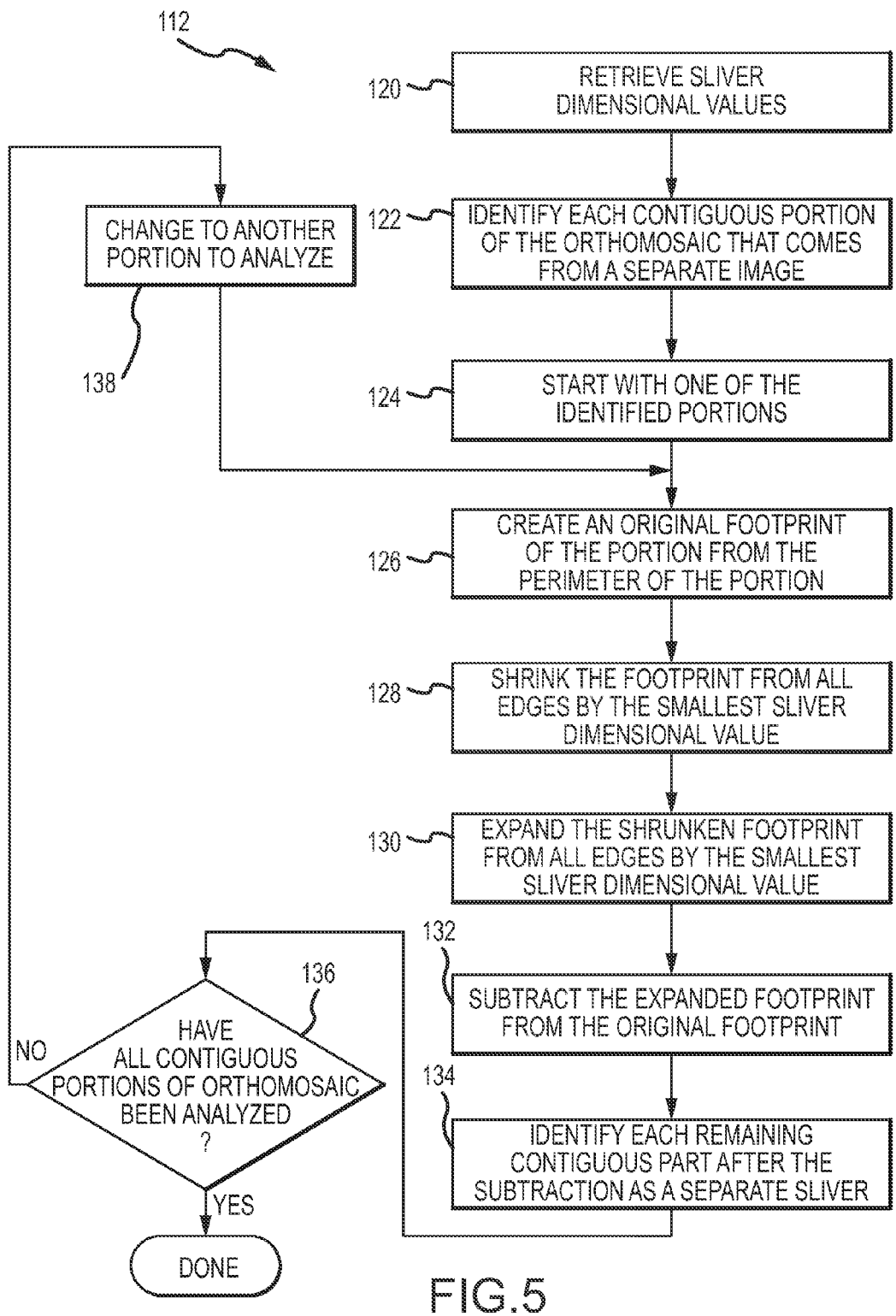
FIG. 5 is a flowchart of a sliver detection algorithm of the process of FIG. 4.
Figure 6:
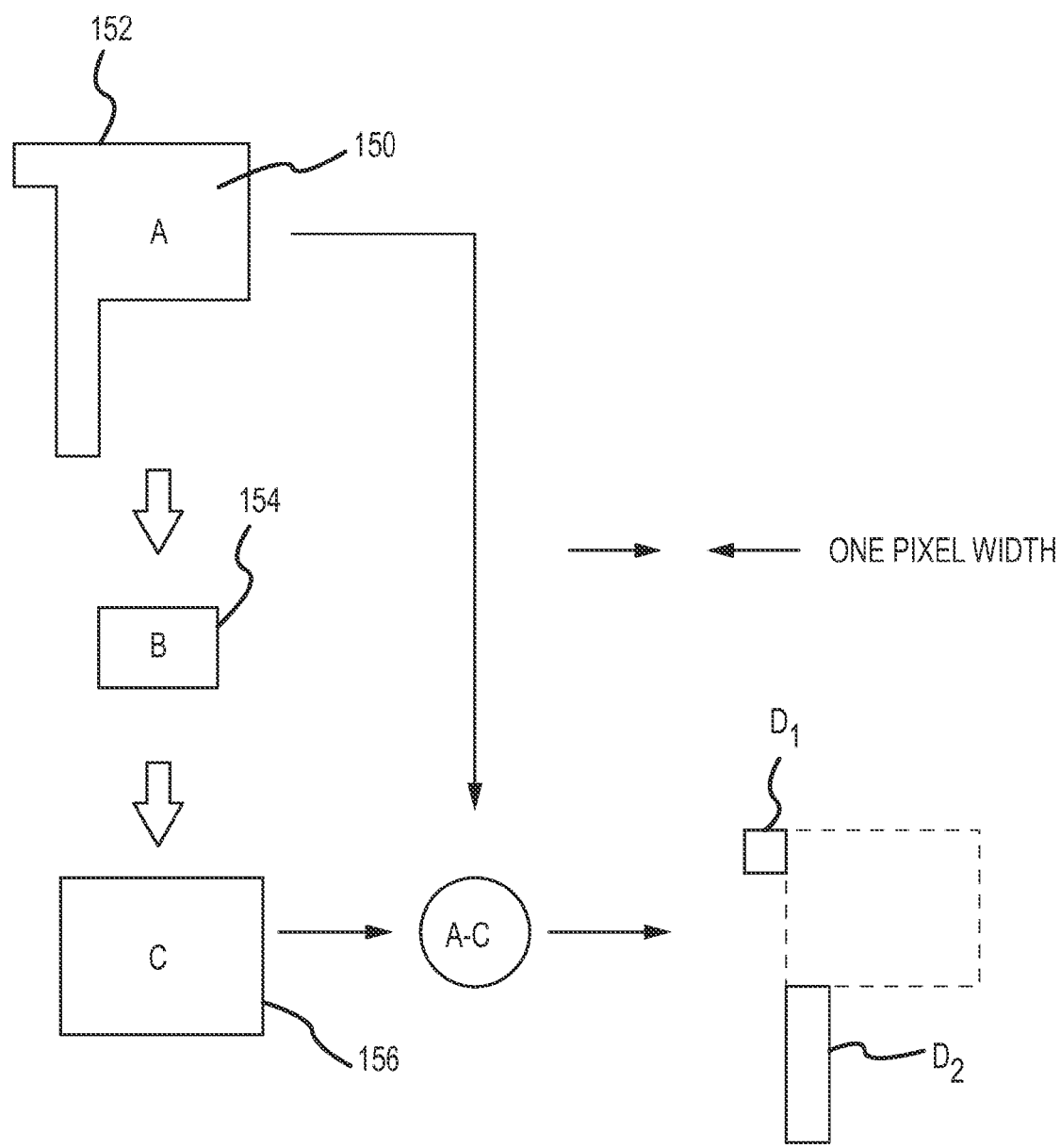
FIG. 6 is an illustration of sliver detection.

Dimensional values that can be used to determine and detect slivers may be predetermined, such as via user configurable values. The user may provide sliver dimensional values via a suitable user interface (not shown). An exemplary sliver detection algorithm 112 can be appreciated by reference to FIGS. 5 and 6. Initially, the sliver dimensional values may be retrieved (120) from a suitable storage location such as the memory 34 shown in FIG. 1. Next, each contiguous portion of the orthomosaic that comes from a separate image is identified (122). An example of such a contiguous portion is shown in FIG. 6 as portion 150 (also designated as A). As can be seen, the portion 150 includes an outer perimeter or edge 152 thereof. Referring back to FIG. 5, the next operation in the sliver detection algorithm 112 is to start (124) with one of the identified portions of the orthomosaic. Next, an original footprint of the portion is created (126) from the perimeter of the portion. This is illustrated in FIG. 6 as the perimeter 152 of the portion 150.

Next, the footprint is eroded or shrunk (128) from all edges thereof by the smallest sliver dimensional value. In the example shown in FIG. 6, the footprint as exemplified by the perimeter 152, is shrunk by a dimension of one pixel from all edges. In this case, one pixel is represented by the width of one square in the background of the drawing. This results in the footprint being shrunk to the shape 154 designated as B in FIG. 6. Following this, the shrunken footprint B is expanded (130 in FIG. 5) from all edges by the smallest dimensional value. This is illustrated in FIG. 6 by the shape 156 that is also designated as C. Next, the expanded footprint C is subtracted (132 in FIG. 5) from the original footprint A. This is illustrated in FIG. 6 by the operation 158 that is designated A-C. Next, each remaining contiguous part after the subtraction is identified (134 in FIG. 5) as a separate sliver. These slivers are represented in FIG. 6 as part $D_1$ and part $D_2$. The remaining original portion of original footprint A that had been subtracted away is shown in dashed lines in FIG. 6.

It should be understood that any reasonable value could be used as the sliver dimensional values. One pixel is used in this simple example merely for ease of description and illustration. For example, the sliver dimensional values could include having a smallest dimension less than five pixels and a largest dimension of at least ten pixels. Similarly, any other suitable and reasonable number could be used for the smallest and largest dimensions. Alternatively, there might be only one sliver dimensional value, and any portion of an orthomosaic having a dimension that small would be characterized as a sliver. Instead of defining slivers based on number of pixels, they could be defined based on other characteristics, such as geospatial metrics (as one example, they could be based on ground distance, such as number of meters).

After the slivers have been identified for that first portion, a test is performed (136) to see if all of the contiguous portions of the orthomosaic have been analyzed for slivers. If the answer is yes, then the sliver detection algorithm 112 is completed. If the answer is no, then the next operation is to change (138) to another portion of the orthomosaic to analyze. Next, the algorithm returns to the operation of creating (126) an original footprint of the portion from the perimeter of the portion. From that point, the algorithm continues as before. In this manner, all of the portions of the orthomosaic are analyzed for slivers before the sliver detection algorithm 112 is completed. It can be appreciated that any other suitable algorithm for sliver detection could alternatively be used. Also, although FIG. 4 shows the sliver detection algorithm 112 being performed once and then the other three algorithms 114, 116, and 118 being performed, it may be desirable for sliver detection 112 to be performed again before each of the second and third algorithms 116 and 118. This may be appropriate because each algorithm has the potential to change the shape or size of slivers.

The next operation, sliver substitution 114, in the overall process 110 is now discussed in conjunction with FIGS. 2, 3, 7, and 8. As was described previously, an orthomosaic 105 (FIG. 3) may include portions 106, 107, 108, and 109 from separate images 101, 102, 103, and 104 (FIG. 2), respectively. After an algorithm such as the sliver detection algorithm 112 discussed above has been performed, it may have been determined that portions 107 and 108 of the orthomosaic 105 are slivers. The exemplary sliver substitution algorithm 114 could then be performed.

Figure 7:
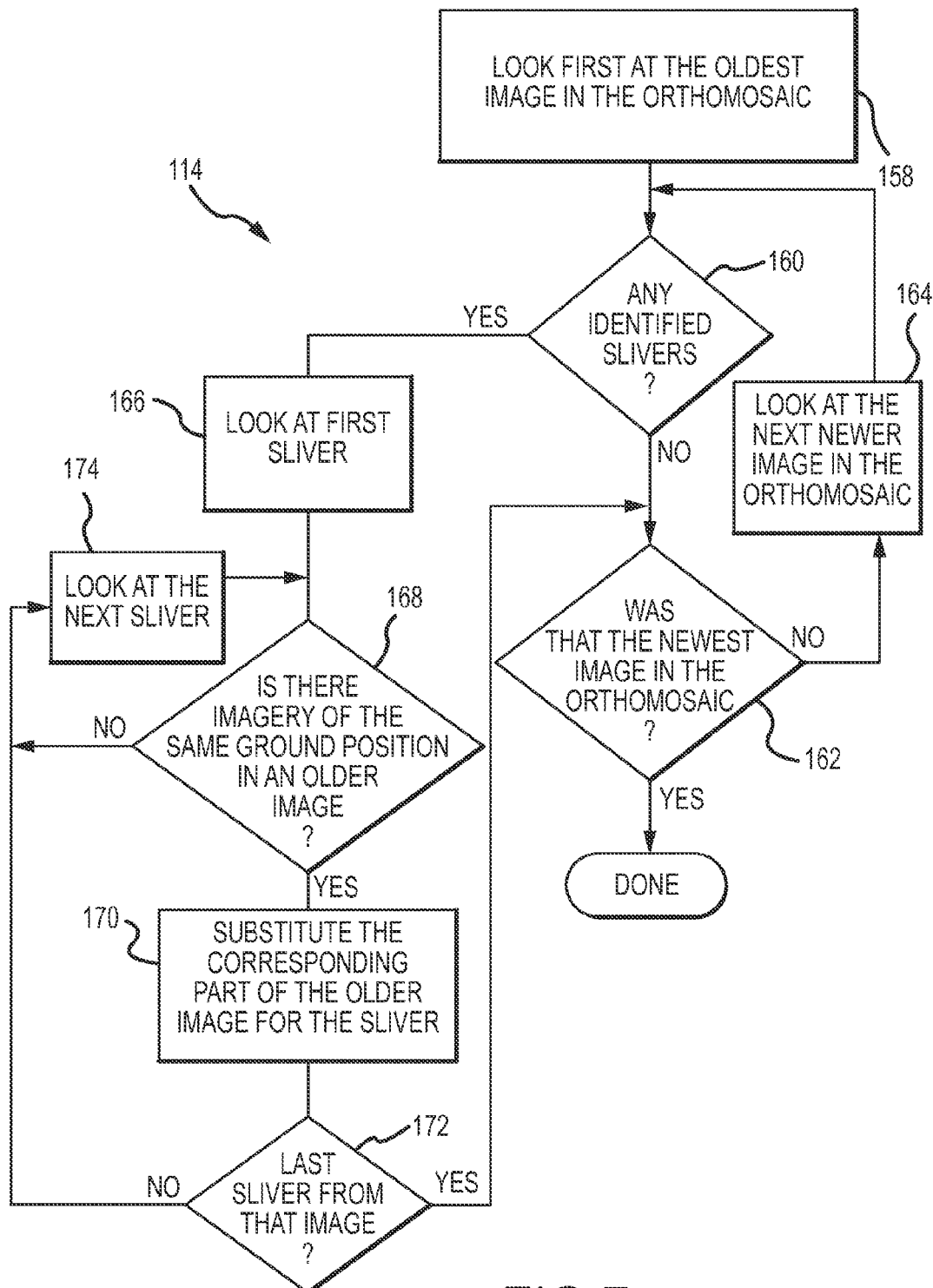
FIG. 7 is a flowchart of a sliver substitution algorithm of the process of FIG. 4.

First of all, with reference to FIG. 7 and the orthomosaic 105 in FIG. 3, the algorithm will look (158) first at the oldest image in the orthomosaic. In this case, since image 104 is the oldest of images 101-104, and therefore portion 109 is older imagery than portions 106-108, portion 109 will be looked at first. Next, the algorithm 114 will determine if that portion 109 has any slivers that have been identified (160). If the answer is no, then the algorithm 114 next performs a test (162) to determine whether that image 109 being looked at is the newest image in the orthomosaic 105. Since the answer is no, the algorithm next looks (164) at the next newer image (108) in the orthomosaic. The algorithm then returns to the previously described test (160).

Figure 8A:
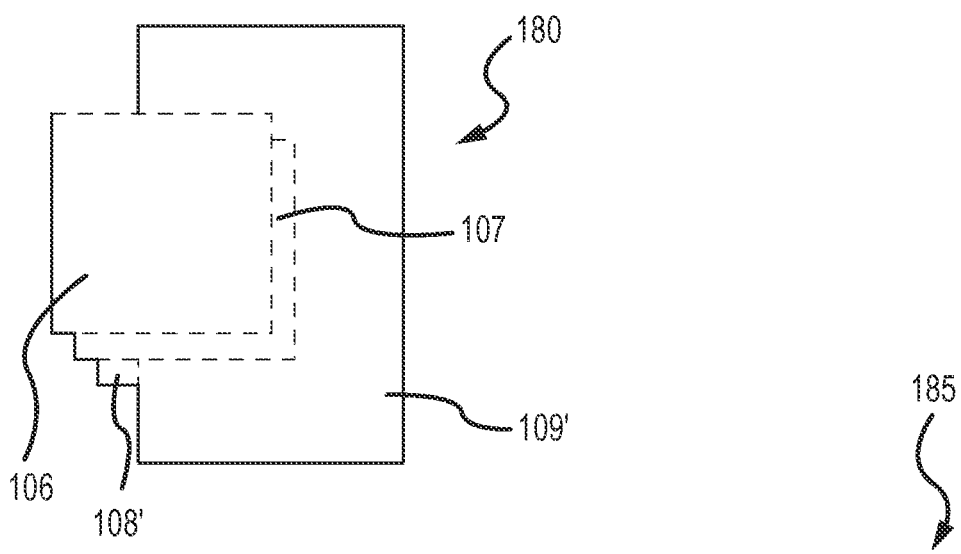
FIGS. 8A, 8B, and 8C are an illustration of sliver substitution.

Now, the portion 108 of the orthomosaic 105 is being looked at. When the test (160) asks if any slivers have been identified, the answer is now yes. In that case, the algorithm 114 proceeds to look (166) at the first sliver in portion 108. Next, a test (168) is performed to see if there is imagery in an older image of the same ground position as the sliver. If the answer is no, then sliver substitution is not available for that sliver and the algorithm 114 would next look (174) at the next sliver in that image. However, in this case the answer is yes, so the algorithm next substitutes (170) the corresponding part of the older image for the identified sliver. With reference to the orthomosaic 180 in FIG. 8A, and by comparison to the orthomosaic 105 in FIG. 3, it can be seen that a majority of the portion 108 has been replaced with underlying imagery that is now part of 109'. A small part of original portion 108 now remains and is shown in FIG. 8A as 108'.

Figure 8B:
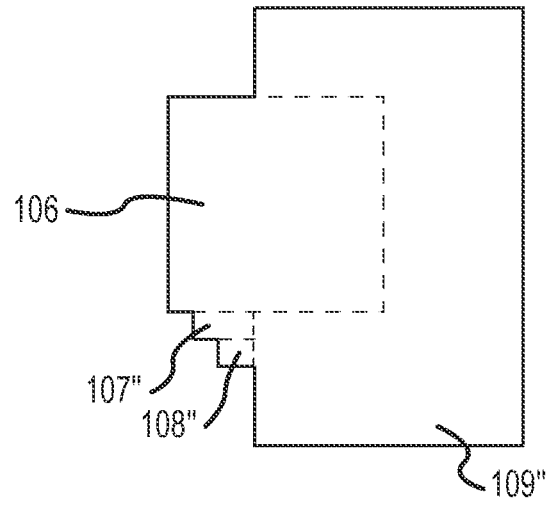

The algorithm 114 then tests (172) to see if that was the last sliver from that image. If not, then the algorithm 114 next looks (174) at the next sliver in that image, as described above. In this case the answer to that test 172 is yes and the algorithm 114 next goes to the previously-described test 162, where it is determined if there is a newer image in the orthomosaic to look at. In this case, the answer is yes, so after operations 164, 160, and 166, the algorithm 114 is now looking at sliver 107 from image 102. As was the case with sliver 108, a large majority of sliver 107 is determined (168) to be of the same ground position as imagery from an older image. Therefore, the algorithm 114 next substitutes (170) the appropriate portions from image 104 for a majority of sliver 107. This is shown in FIG. 8B where a large majority of sliver 107 has been replaced with additional imagery from image 104, which portion is now shown in FIG. 8B as 109". As was also the case with sliver 108, there is a remaining portion of original sliver 107 that cannot be replaced with imagery from image 104. This is shown in FIG. 8B as remaining sliver 107".

The algorithm 114, via tests 172 and 162 and operation 164, next looks at image 101 identified in FIG. 3 as portion 106. Because there are no slivers that have been identified therein, the answer to test 160 is no, which results in the algorithm next performing the test 162, to which the answer is yes and the algorithm 114 is completed.

Figure 8C:
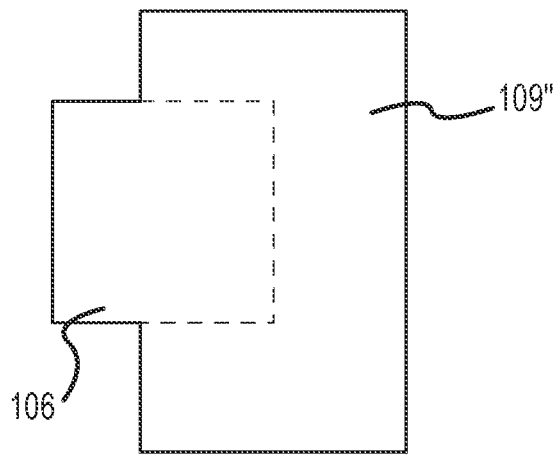
Figure 9:
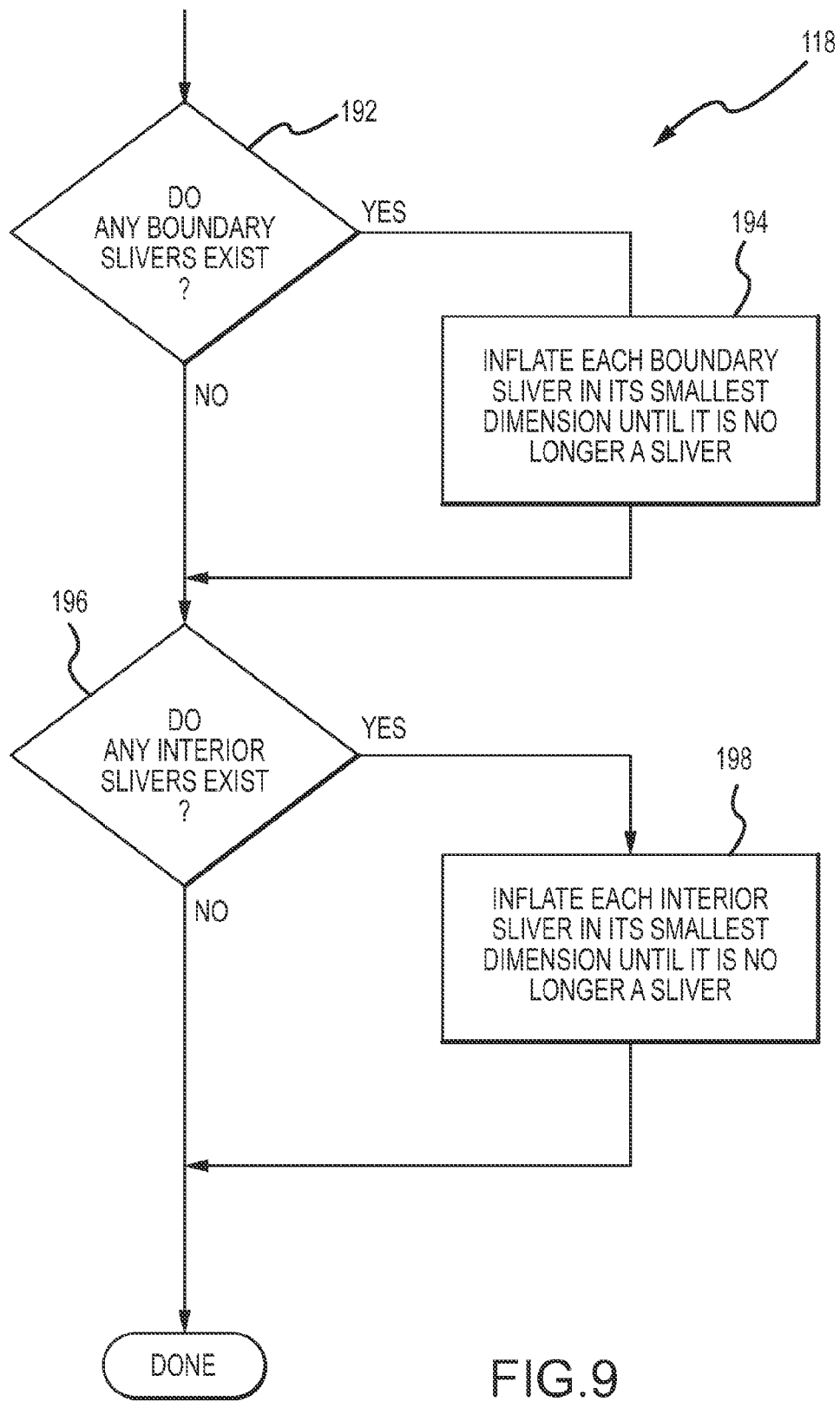
FIG. 9 is a flowchart of a sliver inflation algorithm of the process of FIG. 4.

Another portion of the overall process 110 is boundary sliver removal 116, which is described in conjunction with FIGS. 8B and 8C. The boundary sliver removal algorithm 116 includes determining if any identified slivers exist along the perimeter of the orthomosaic. As can be seen in FIG. 8B, portions 107" and 108" are each slivers touching the perimeter of the orthomosaic 185. Thus, these two portions 107" and 108" are each boundary slivers. Next, these boundary slivers 107" and 108" are deleted from the orthomosaic 185. It is noted that the handling of boundary slivers from oldest to newest can be important. Otherwise, a sliver might be deemed as a non-boundary sliver initially, but later become a boundary sliver if an adjacent boundary sliver is removed, and thus the algorithm would be incorrect. After the boundary slivers have been deleted, the resulting orthomosaic 190 is shown in FIG. 8C. It may be appreciated that the boundary sliver removal algorithm 116 may be an optional portion of the overall process 110. In other words, a user may configure the overall process 110 to include boundary sliver removal or to not include boundary sliver removal. Alternatively, when the orthomosaic is formed, the user may be prompted to select whether or not one or more of the boundary slivers are to be removed.

Figure 10A:
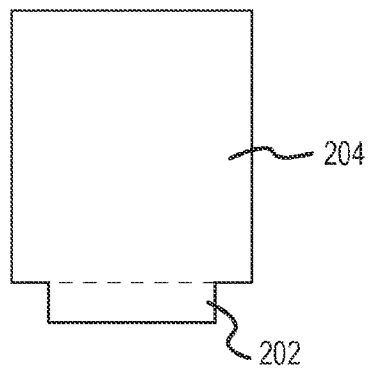
FIGS. 10A and 10B are an illustration of boundary sliver inflation.
Figure 10B:
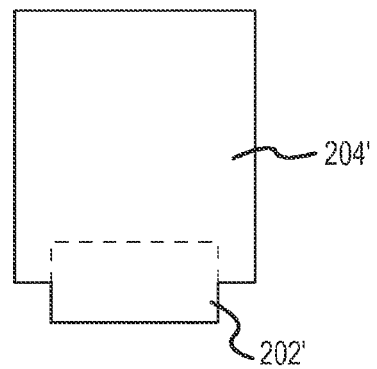

Another portion of the overall process 110 is the sliver inflation algorithm 118 which is illustrated in FIGS. 9, 10A, 10B, 11A, and 11B. It may be important to only perform inflation of older imagery into newer imagery, so that additional slivers are not created on imagery that has already been processed. First, the algorithm 118 tests (192) to determine if any boundary slivers exist. If yes, then each boundary sliver is inflated (194) in its smallest dimension until it is no longer a sliver. This is illustrated in FIGS. 10A and 10B in which orthomosaic 200 includes an image portion 204 and an image portion 202 that is from older imagery than is image portion 204. Because the portion 202 is a boundary sliver, and because the portion 202 was part of an image that underlies (covers the same ground points as) corresponding portions of image portion 204, the image portion 202 can be expanded or inflated until the sliver is no longer a sliver. This is shown in FIG. 10B in which the orthomosaic 205 includes an expanded portion 202' and a diminished portion 204'.

Figure 11A:
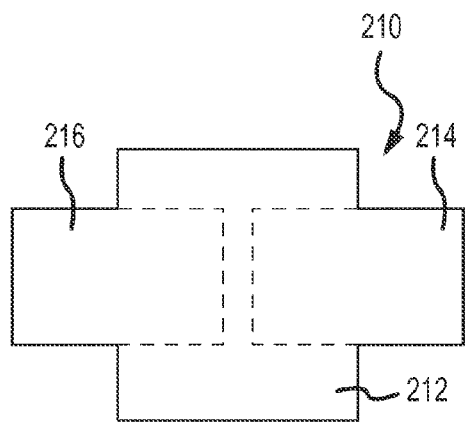
FIGS. 11A and 11B are an illustration of interior sliver inflation.
Figure 11B:
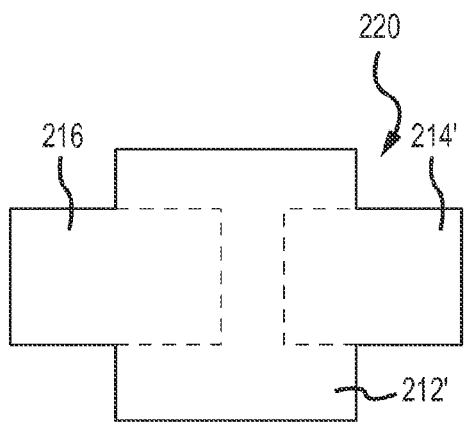

Next, the algorithm 118 tests (196) to see if any interior slivers exist. If there are none, then the algorithm 118 is finished. If yes, then each interior sliver is inflated (198) in its smallest dimension until it is no longer a sliver. This is illustrated in FIGS. 11A and 11B in which orthomosaic 210 includes older image portion 212, next younger image portion 214, and newest image portion 216. Because the section of portion 212 located between portions 214 and 216 is an interior sliver, this section is expanded in the direction of portion 214 resulting in an orthomosaic 220 that includes an expanded section 212', a diminished section 214', and portion 216. As can be appreciated, in this manner, both boundary slivers and interior slivers can be inflated until they are no longer slivers. Of course, in order to do this, there needs to be overlapping imagery so that the sliver can be inflated. Alternatively, it may be desirable to only inflate interior slivers and not boundary slivers, or to inflate boundary slivers and not interior slivers.

Further, it can be appreciated that any combination of the algorithms 112, 114, 116, and 118 in the overall process 110 can be used to remove or reduce slivers in orthomosaics. The algorithms could be performed in any order desired. Additional algorithms could also be added to the overall process 110.

It should also be appreciated that, depending upon the nature of the algorithms and the order in which they are performed, it may be possible in certain situations for the overall process of removing slivers to never be completed. In other words, it is not possible to remove all slivers in all situations, as sometimes they can only be minimized. Thus, in order to continue to make progress toward removing all slivers or reducing them as far as possible, there may be certain practical rules that are applied. This may include performing each algorithm on first the oldest portions of an orthomosaic and progressing through the portions of the mosaic until the newest portion is processed with that algorithm last. If suitable, the algorithms could process portions of the image in any other appropriate order or manner.

While a particular arrangement of algorithms 112, 114, 116, and 118 have been described above, it should be appreciated that any arrangement or combination of these algorithms could be performed. In other words, only algorithms 112 and 114 might be performed, or only algorithms 112 and 116, or only algorithms 112 and 118, or any other combination of the algorithms. Also, other algorithms could be combined with these algorithms. As one specific example, there may exist a use case where the customer applies a requirement that each of the various images making up the orthomosaic (prior to sliver removal) must participate in the orthomosaic after the slivers have been removed. In such case, one solution might be to only perform the algorithms 112 and 118.

It should also be understood that, while the description above has related to removing slivers from orthomosaics made up of a plurality of image portions, the techniques described are also applicable to any other situation where there is an arrangement of two-dimensional polygons. In such other situations, the algorithms described herein could be used to remove slivers.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 12:
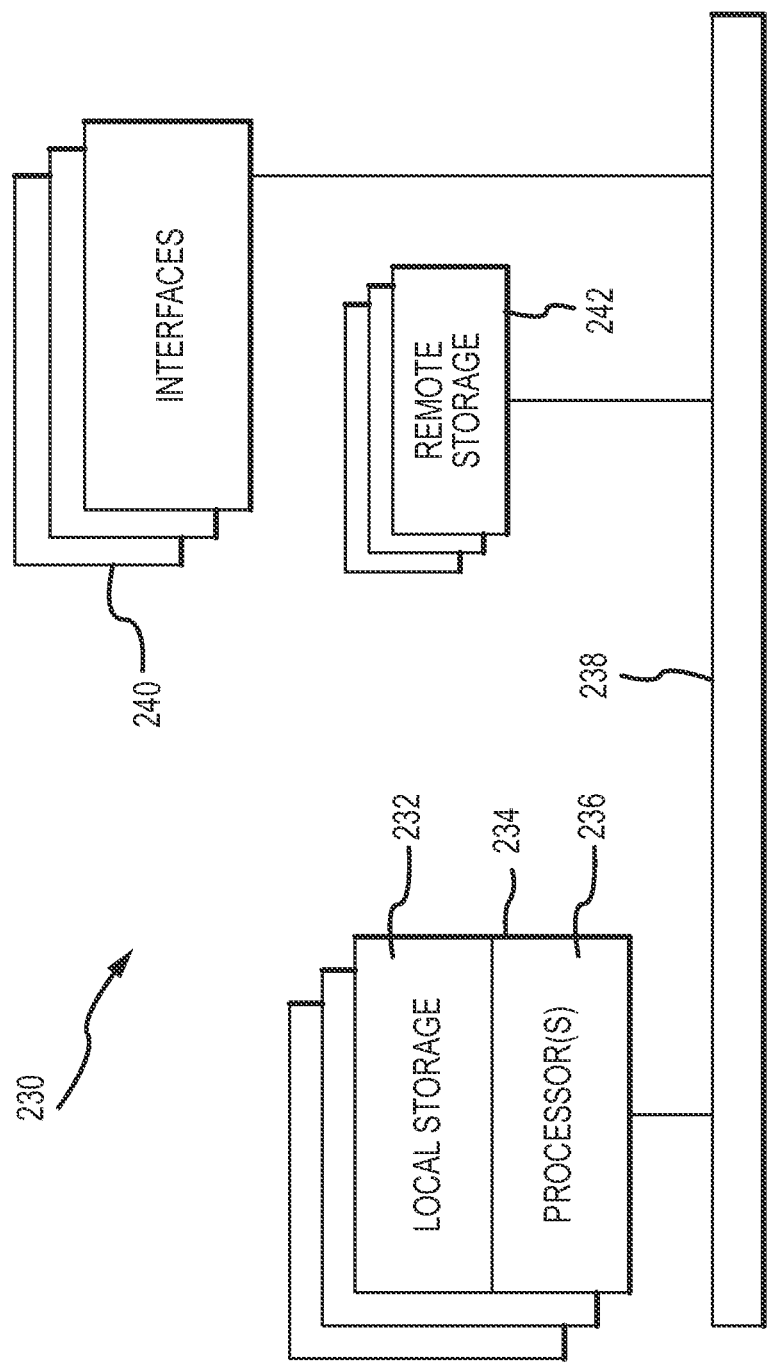
FIG. 12 is a block diagram illustrating an exemplary hardware architecture of a computing device used in an embodiment of the disclosure herein.

Referring now to FIG. 12, there is shown a block diagram depicting an exemplary computing device 230 suitable for implementing at least a portion of the features or functionalities disclosed herein. Computing device 230 may be, for example, any one of the computing machines listed in the previous paragraph, or indeed any other electronic device capable of executing software- or hardware-based instructions according to one or more programs stored in memory. Computing device 230 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 230 includes one or more central processing units (CPU) 234, one or more interfaces 240, and one or more busses 238 (such as a peripheral component interconnect (PCI) bus). When acting under the control of appropriate software or firmware, CPU 234 may be responsible for implementing specific functions associated with the functions of a specifically configured computing device or machine. For example, in at least one embodiment, a computing device 230 may be configured or designed to function as a server system utilizing CPU 234, local memory 232 and/or remote memory 242, and interface(s) 240.

In at least one embodiment, CPU 234 may be caused to perform one or more of the different types of functions and/or operations under the control of software modules or components, which for example, may include an operating system and any appropriate applications software, drivers, and the like. CPU 234 may include one or more processors 236 such as, for example, a processor from one of the Intel, ARM, Qualcomm, and AMD families of microprocessors. In some embodiments, processors 236 may include specially designed hardware such as application-specific integrated circuits (ASICs), electrically erasable programmable read-only memories (EEPROMs), field-programmable gate arrays (FPGAs), and so forth, for controlling operations of computing device 230. In a specific embodiment, a local memory 232 (such as non-volatile random access memory (RAM) and/or read-only memory (ROM), including for example one or more levels of cached memory) may also form part of CPU 234. However, there are many different ways in which memory may be coupled to system 230. Memory 232 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 240 are provided as network interface cards (NICs). Generally, NICs control the sending and receiving of data packets over a computer network; other types of interfaces 240 may for example support other peripherals used with computing device 230. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 240 may include ports appropriate for communication with appropriate media. In some cases, they may also include an independent processor and, in some instances, volatile and/or non-volatile memory (e.g., RAM).

Although the system shown in FIG. 12 illustrates one specific architecture for a computing device 230 for implementing one or more of the embodiments described herein, it is by no means the only device architecture on which at least a portion of the features and techniques described herein may be implemented. For example, architectures having one or any number of processors 236 may be used, and such processors 236 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 242 and local memory 232) configured to store data, program instructions for the general-purpose network operations, or other information relating to the functionality of the embodiments described herein (or any combinations of the above). Program instructions may control execution of or comprise an operating system and/or one or more applications, for example. Memory 242 or memories 232, 242 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 13:
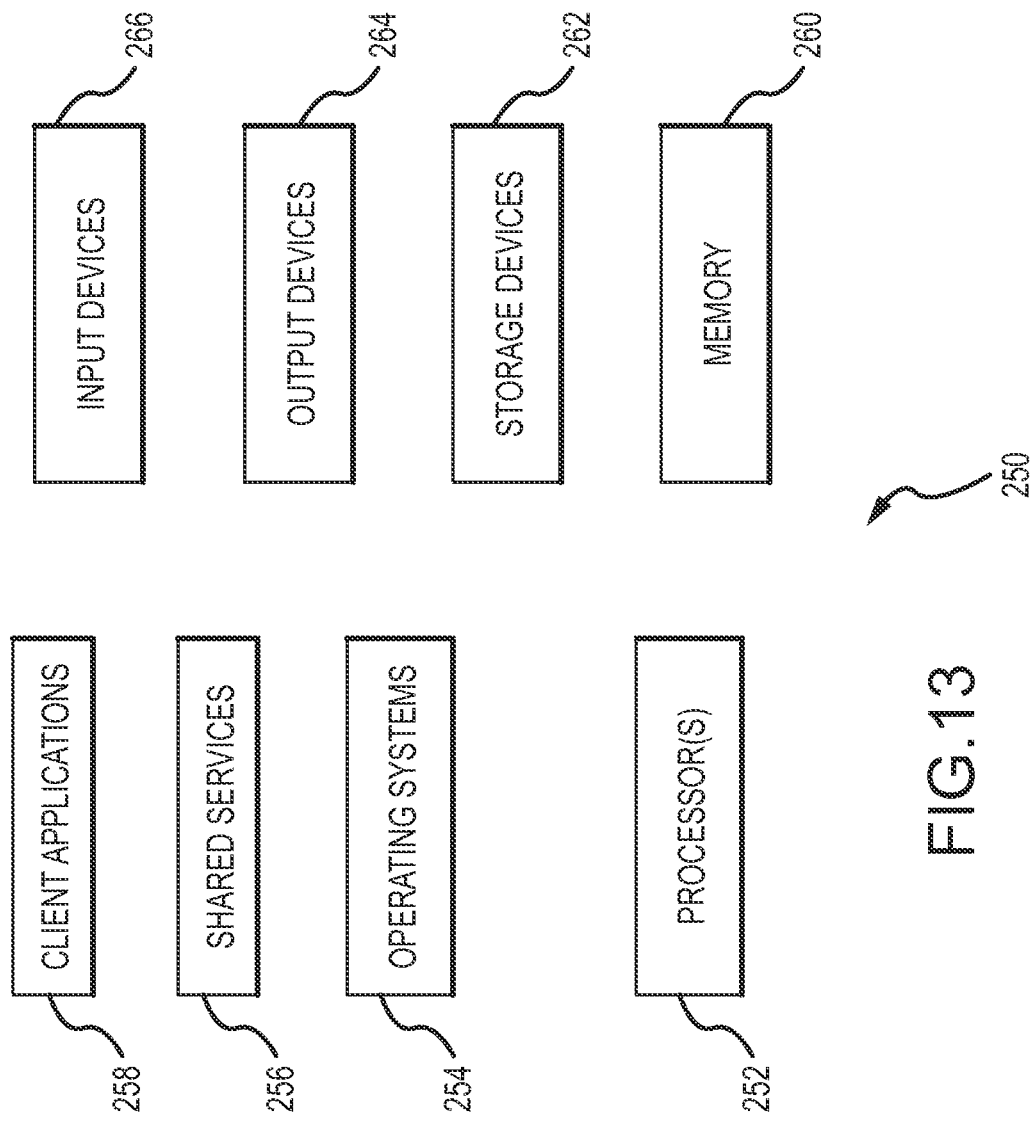
FIG. 13 is a block diagram illustrating an exemplary logical architecture for a client device, according to an embodiment of the disclosure herein.

In some embodiments, systems may be implemented on a standalone computing system. Referring now to FIG. 13, there is shown a block diagram depicting a typical exemplary architecture of one or more embodiments or components thereof on a standalone computing system. Computing device 250 includes processors 252 that may run software that carry out one or more functions or applications of embodiments, such as for example a client application 258. Processors 252 may carry out computing instructions under control of an operating system 254 such as, for example, a version of Microsoft's Windows operating system, Apple's Mac OS/X or iOS operating systems, some variety of the Linux operating system, Google's Android operating system, or the like. In many cases, one or more shared services 256 may be operable in system 250, and may be useful for providing common services to client applications 258. Services 256 may for example be Windows services, user-space common services in a Linux environment, or any other type of common service architecture used with operating system 254. Input devices 266 may be of any type suitable for receiving user input, including for example a keyboard, touchscreen, microphone (for example, for voice input), mouse, touchpad, trackball, or any combination thereof. Output devices 264 may be of any type suitable for providing output to one or more users, whether remote or local to system 250, and may include for example one or more screens for visual output, speakers, printers, or any combination thereof. Memory 260 may be random-access memory having any structure and architecture known in the art, for use by processors 252, for example to run software. Storage devices 262 may be any magnetic, optical, mechanical, memristor, or electrical storage device for storage of data in digital form. Examples of storage devices 262 include flash memory, magnetic hard drive, CD-ROM, and/or the like.

Figure 14:
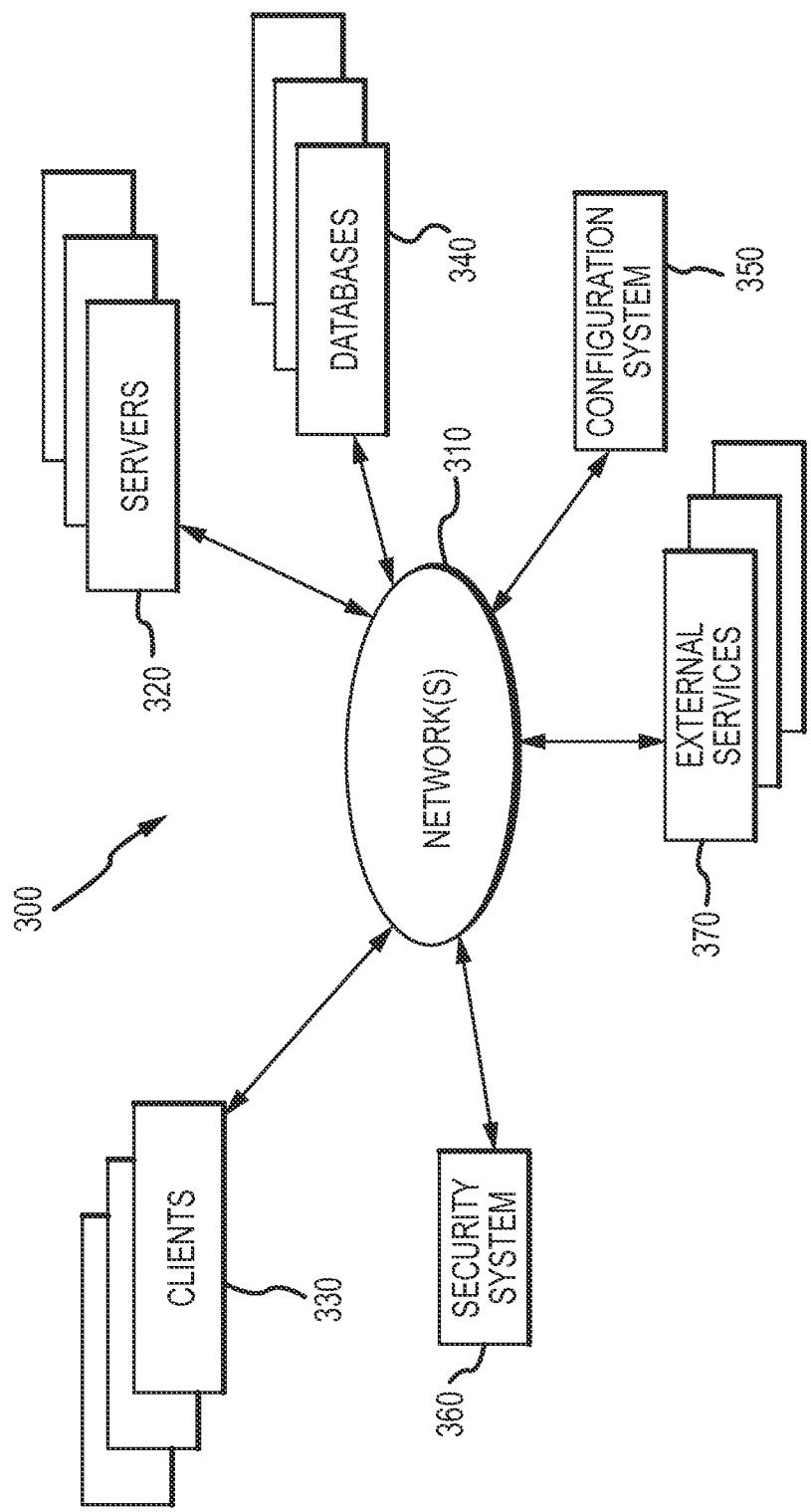
FIG. 14 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 14, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 250 such as that illustrated in FIG. 13. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 258 are implemented on a smartphone or other electronic device, client applications 258 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A computer-implemented process for improving an orthomosaic composed of portions from a plurality of different images, comprising:
providing an orthomosaic composed of portions of a first image and portions of a second image, wherein the first image was captured later in time than the second image;
automatically detecting with a computer one or more slivers in the orthomosaic by identifying one or more portions of the first image in the orthomosaic that have a width less than a predetermined width and a length greater than a predetermined length and by identifying one or more portions of the second image in the orthomosaic that have a width less than a predetermined width and a length greater than a predetermined length;
automatically with a computer substituting a portion of the second image for one of the detected slivers from the first image;
automatically with a computer removing one or more slivers along a perimeter of the orthomosaic; and
automatically with a computer inflating one or more remaining slivers from the second image.

2. A process as defined in claim 1, wherein the identifying includes performing an erosion on one or more of the portions followed by an inflation of the eroded portion and then comparing the result of the inflation to the portion that existed prior to the erosion.

3. A process as defined in claim 1, wherein the identifying includes counting the number of pixels wide and the number of pixels long for one of more portions of the first image.

4. A process as defined in claim 1, wherein portions of the first image and portions of the second image overlap with each other as to geodetic portions captured in each image, and wherein the substituted portions of the first and second images are overlapping portions.

5. A process as defined in claim 1, wherein the removing portion of the process is optional, based on a user configuration made prior to the computer running the process.

6. A process as defined in claim 5, wherein, if the user configuration for perimeter sliver removal is made, all of the boundary slivers are removed.

7. A process as defined in claim 1, wherein all of the boundary slivers are removed.

8. A process as defined in claim 1, wherein the inflated slivers are those that are not along a perimeter of the orthomosaic.

9. A process as defined in claim 1, wherein the inflating includes replacing portions of adjacent portions of the orthomosaic.

10. A process as defined in claim 9, wherein the replaced portions are from the first image and the replacing portions are from the second image.

11. A process as defined in claim 10, wherein portions of the first image and portions of the second image overlap with each other as to geodetic portions captured in each image, and wherein the replaced portions and the replacing portions of the first and second images, respectively, are overlapping portions.

12. A process as defined in claim 10, wherein the inflated slivers are those that are not along a perimeter of the orthomosaic.

13. A computer-implemented process for improving an orthomosaic composed of portions from a plurality of different images, comprising:
- providing an orthomosaic composed of portions of a first image and portions of a second image, wherein the first image was captured later in time than the second image, and wherein whenever the first image and the second image have one or more portions that overlap with each other, the first image is used for the overlapping portions;
- automatically detecting with a computer one or more slivers in the orthomosaic by identifying one or more portions of the first image in the orthomosaic that have a width less than a predetermined width and a length greater than a predetermined length; and
- automatically with a computer substituting a portion of the second image for one of the detected slivers in the first image.

14. A process as defined in claim 13, wherein the identifying includes performing an erosion on one or more of the portions followed by an inflation of the eroded portion and then comparing the result of the inflation to the portion that existed prior to the erosion.

15. A process as defined in claim 13, wherein the identifying includes counting the number of pixels wide and the number of pixels long for one of more portions of the first image.

16. A process as defined in claim 13, wherein portions of the first image and portions of the second image overlap with each other as to geodetic portions captured in each image, and wherein the substituted portions of the first and second images are overlapping portions.

17. A computer-implemented process for improving an orthomosaic composed of portions from a plurality of different images, comprising:
- providing an orthomosaic composed of portions of a first image and portions of a second image, wherein the first image was captured later in time than the second image, and wherein whenever the first image and the second image have one or more portions that overlap with each other, the first image is used for the overlapping portions;
- automatically detecting with a computer one or more slivers in the orthomosaic by identifying one or more portions of the second image in the orthomosaic that have a width less than a predetermined width; and
- automatically removing with a computer one or more of the slivers without replacing the one or more slivers with portions of the second image.

18. A process as defined in claim 17, wherein the automatically removing operation is performed first on the older, second image and then on the newer, first image.

19. A process as defined in claim 17, wherein the automatically removing includes automatically with a computer substituting a portion of the second image for one of the detected slivers from the first image.

20. A process as defined in claim 17, wherein the automatically removing includes automatically with a computer removing one or more slivers along a perimeter of the orthomosaic.

21. A process as defined in claim 17, wherein the automatically removing includes automatically with a computer inflating one or more remaining slivers from the second image.

22. A process as defined in claim 17, wherein the automatically detecting with a computer one or more slivers in the orthomosaic further includes identifying the one or more portions of the second image in the orthomosaic that have a length greater than a predetermined length.

* * * * *